(12) United States Patent
Cadens Ballarin et al.

(10) Patent No.: US 12,365,151 B2
(45) Date of Patent: Jul. 22, 2025

(54) METHOD FOR PRODUCING A BODY PROTECTION ITEM AND RESULTING BODY PROTECTION ITEM

(71) Applicant: MAT PRODUCT & TECHNOLOGY, S.L., Terrassa (ES)

(72) Inventors: Javier Cadens Ballarin, Sant Boi de Llobregat (ES); Xavier Mateu Codina, Matadepera (ES)

( * ) Notice: Subject to any disclaimer, the term of this patent is extended or adjusted under 35 U.S.C. 154(b) by 504 days.

(21) Appl. No.: 17/774,233

(22) PCT Filed: Nov. 3, 2020

(86) PCT No.: PCT/ES2020/070673
§ 371 (c)(1),
(2) Date: May 4, 2022

(87) PCT Pub. No.: WO2021/089897
PCT Pub. Date: May 14, 2021

(65) Prior Publication Data
US 2023/0026319 A1    Jan. 26, 2023
US 2024/0009944 A9    Jan. 11, 2024

(30) Foreign Application Priority Data
Nov. 4, 2019  (ES) .............................. ES201931804U

(51) Int. Cl.
*B32B 5/14* (2006.01)
*B29C 70/30* (2006.01)
(Continued)

(52) U.S. Cl.
CPC .............. *B29C 70/68* (2013.01); *B29C 70/30* (2013.01); *B29K 2025/06* (2013.01); *B29K 2067/003* (2013.01); *B29L 2031/768* (2013.01)

(58) Field of Classification Search
CPC ..... B29C 70/40; B29C 70/465; B29C 70/467; B29C 70/506; B29C 70/742;
(Continued)

(56) References Cited

U.S. PATENT DOCUMENTS 4,612,238 A * 9/1986 DellaVecchia ........ B29C 48/305
428/338
2014/0352036 A1* 12/2014 Cadens Ballarin ..... B29C 43/52
425/384

FOREIGN PATENT DOCUMENTS

WO    WO-2019069639 A1 *   4/2019  ............. B29C 43/18

OTHER PUBLICATIONS

Translation of WO 2019069639 A1 (Year: 2019).*

* cited by examiner

*Primary Examiner* — Hoa (Holly) Le
(74) *Attorney, Agent, or Firm* — Eugenio J. Torres-Oyola; Victor M. Rodriguez-Reyes; Rafael Rodriguez-Muriel

(57) ABSTRACT

Manufacturing method of a body protection and resulting body protection, wherein the method comprises producing a structural shell (10) with a maximum thickness of 5 mm, made of thermoplastic material, and defining a concave interior (11) and a convex exterior (12); over-moulding an expanded polystyrene layer (20) overlapping the concave interior (11) of the structural shell (10), producing its adhesion by close contact to the structural shell (10); and wherein the structural shell (10) is produced by means of the distributed placement, in a mould, of a mixture of thermoplastic material and of reinforcing fibres stable at temperatures equal to or lower than the melting temperature of the thermoplastic material, the closure and heating of the mould causing the melting of the thermoplastic material without damaging the reinforcing fibres, and the subsequent cooling (Continued)

of the mould, hardening the thermoplastic material with the reinforcing fibres embedded therein.

14 Claims, 2 Drawing Sheets

(51) Int. Cl.
*B29C 70/68* (2006.01)
*B29K 25/00* (2006.01)
*B29K 67/00* (2006.01)
*B29L 31/00* (2006.01)

(58) Field of Classification Search
CPC ....... B29C 70/745; B29B 11/06; B29B 11/12; B29B 13/022; B29B 15/08; B29B 15/10; B32B 5/14; B32B 5/145; B32B 5/28
See application file for complete search history.

METHOD FOR PRODUCING A BODY PROTECTION ITEM AND RESULTING BODY PROTECTION ITEM

FIELD OF THE ART

This invention concerns the field of manufacturing methods of body protections comprising a structural shell and an expanded polystyrene layer, and the resulting body protections of said method. Herein it will be understood that the shell is the outermost layer of the body protection, that is, the first one to receive impacts.

A structural shell is a hard element intended to offer substantial protection against impacts and to distribute the stresses over a larger area than that of the impact surface, thus reducing the local pressures and thus reducing the possible direct damages that said impact may cause on a part of the body of the user protected by said body protection.

Said body protection may be a protection for articulations, such as ankles, knees, elbows or shoulders, it may be a protection for leg or arm long bones, of limbs such as parts of boots or gloves, or it may be a protection for parts of the torso, although the preferred use for said body protection will be in the shape of a helmet for the protection of the head of a user.

In general, an expanded polystyrene layer is placed within the structural shell of the helmets which absorbs the energy of the large impacts to protect the head contained in the helmet.

The distribution of forces over a larger area allows for a larger section of the expanded polystyrene layer to work in the deceleration of the impact, thus homogenising the mechanical response of the assembly against impacts with surfaces of a reduced area. The structural shell also has other functions, such as, for instance, abrasion resistance.

The proposed body protection may be, for example, an automotive helmet for car, motorcycle or other vehicle, bicycle helmets, skiing helmets, adventure activity helmets such as mountain climbing, skydiving, paragliding, sports helmets for example for hockey, baseball, American football, work helmets, such as construction, mining helmets, as well as other body protections such as an elbow pad, a wrist guard, a kneepad, an ankle guard, a shoulder pad, at least part of a boot or of a glove, a shin guard, an arm or forearm protection, a groin guard, a chest or back protection, etc.

STATE OF THE ART

Body protections are known that include a shell with an expanded polystyrene layer adhered to its interior for the absorption of impacts.

Based on the helmet typology and on the testing regulation to be met, there are structural shells, intended to withstand and offer protection against impacts, and non-structural shells that only offer protection against abrasion, but not against impacts.

The non-structural shells usually have a very limited thickness, typically lower than 1 mm. Commonly, these non-structural shells are produced by means of thermoforming moulding starting from straight, thin sheets. This type of non-structural shells relies the structural resistance against impacts on an underlying layer of the helmet made of a suitable material for the absorption of impacts, typically expanded polystyrene or polystyrene foam.

In the field of bicycle helmets, the use of a non-structural shell on which an expanded polystyrene layer is over-moulded—which, thanks to this over-moulding process, is attached by close contact to the non-structural shell—is common.

It is frequent that said non-structural shell is also manufactured with polycarbonate, which has a melting temperature much higher than the temperature reached during the over-moulding process of the expanded polystyrene, such that the material is not altered during the over-moulding process, but the adherence of the expanded polystyrene on the polycarbonate is limited and it is frequent that they eventually become detached over time.

The structural shells usually have a high thickness of several millimetres. In the most common embodiment, the structural shell is made of a plastic material, typically a thermoplastic, which may be easily manufactured by injection, achieving an inexpensive and fast manufacturing, but which requires considerable thicknesses to achieve a sufficient structural strength, producing structural shells of high weight which may be uncomfortable to wear during prolonged periods of time, or which entail a disadvantage in competitive sport situations or in high performance situations.

In the cases wherein a low-weight structural shell is required, structural shells manufactured from composite are known that provide a sufficient structural protection with lower thicknesses and, therefore, with lower weight.

These composite structural shells comprise glass and/or carbon fibres combined with a thermosetting matrix, for example, epoxy resins, polyester or vinyl ester. Said thermosetting materials cannot be melted or softened applying heat once cured; therefore, if these structural shells are used in over-moulding processes of the expanded polystyrene, they are not altered either, although the achieved adhesion with the thermosetting matrix is also not very high, the occurrence of detachments being likely.

The manufacturing of said composite structural shells is also more expensive than the manufacturing of structural shells made of plastic material without reinforcing fibres, such that solutions which allow to reduce their cost are required.

In the field of body protections with a structural shell constituting full-face helmets, due to the closed shape that these helmets have, the expanded polystyrene is not over-moulded over the intrados of the structural shell, since the required mould would be very complex, but the expanded polystyrene layer is rather manufactured separately, and is subsequently brought into and adhered to the concave interior of the structural shell. This solution causes the contact between the structural shell and the expanded polystyrene layer to only be limited to a few points where adhesive is placed, so that said layer is not adhered across its entire surface, and therefore in this type of helmet the strength and rigidity of the structural shell is not improved when including the expanded polystyrene layer. In other words, the mechanical properties of the assembly formed by the structural shell plus the impact absorption material are those typical of a system made of two overlapping materials, without the attachment to each other. Additionally, the insertion and adhesion process of the two components cannot be automated, such that it increases the final cost of the helmet.

In the case of manufacturing the expanded polystyrene layer separately and subsequently proceeding to its adhesion to a structural shell made of composite material by means of adhesives, there is the previously described limitation that the mechanical properties of the structural shell are not improved, that they will be those typical of a system made of the two overlapping materials, with no attachment to each other.

EP2808160 discloses a method of manufacture particularly aimed at manufacturing a body made of thermoplastic matrix composite material provided with an inner cavity with an outward opening, said cavity comprising at least one concave curved wall and the outward opening having a smaller dimension or width than the maximum dimension of the inner cavity between two opposite walls. Particularly, said hollow body can be the shell of a protective helmet, such as for example a motorcycle helmet, or the structural component of sports footwear for practicing sports that require very rigid footwear, for example a ski boot.

EP1627575 discloses a helmet 10 which comprises an outer shell 11 which forms a bubble 12 with a lower or base portion 12a and a chin protector 13, an annular band or strip 20 located within and at a distance from the base portion 12a of the bubble and from the chin protector 13, and a layer 30 of expanded polystyrene injected onto the inner surface of the bubble or into the intermediate annular gap or space 14 (FIG. 4) which is bounded on the inside by the annular band 20 and on the outside by the base portion 12a of the bubble and by the chin protector 13.

Therefore, a solution is required that allows obtaining a helmet with a high strength, a light and low-cost structural shell which may be firmly attached to an expanded polystyrene layer, so that its strength is improved even further.

This and other advantages are obtained from the following proposed product.

BRIEF DESCRIPTION OF THE INVENTION

This invention concerns, according to a first embodiment, a manufacturing method of a body protection comprising, in a manner known per se in the state of the art, the following steps:
producing a structural shell with a maximum thickness of 5 mm, made of a thermoplastic material, and defining a concave interior and a convex exterior;
over-moulding an expanded polystyrene layer overlapping the concave interior of the structural shell, producing its adhesion by close contact to the structural shell.

It will be understood that the structural shell is the outermost layer of the body protection, which receives impacts directly in the case of an accident. Said structural shell defines a concave interior, corresponding to the interior of the helmet intended to house the body part of the user to be protected.

On said concave interior an expanded polystyrene layer is superimposed, which will remain surrounding the body part of the user, underneath the structural shell.

Said expanded polystyrene layer will suffer distortion and crushing in the case of a severe impact, absorbing energy that will not be transferred to the body part of the user, likewise managing the stroke deceleration so that the maximum acceleration suffered by the head is reduced, thus protecting it.

The manufacturing step, by means of over-moulding, of said expanded polystyrene layer on the intrados of the structural shell produces the adhesion of said expanded polystyrene layer to the concave interior of the structural shell by close contact, that is, all the exterior surface of the expanded polystyrene layer that is opposite and connected to the concave interior of the structural shell, with no gap or separation nor any interposed material such as adhesives between said surfaces, the expanded polystyrene layer being included inside any existing nook, relief or texture in the concave intrados of the structural shell.

This close contact is achieved by means of the over-moulding process of the expanded polystyrene layer on the intrados of the structural shell. This manufacturing process comprises manufacturing the structural shell, introducing it in a mould, closing the mould, introducing the material constituting the pre-expanded polystyrene and steam at a temperature comprised between 100° C. and 130° C. inside said closed mould, causing, by means of an expanding agent, the expansion of the expanded polystyrene which will conform moulding itself against the concave intrados of the structural shell and, therefore, remaining adhered thereto by close contact, without adhesives.

This characteristic, according to which the expanded polystyrene layer and the structural shell remain closely attached despite in the absence of adhesives between them, allows on the one hand to reduce manufacturing costs, since an assembly step or the application of adhesives is not required, which saves labour and time.

Additionally, the close attachment between both elements also allows them to cooperate structurally, which allows increasing the final strength of the helmet, improving its functionality, or allows to reduce the thickness of the structural shell without losing strength thanks to the structural reinforcement provided by the close attachment with the expanded polystyrene layer, which allows to reduce material and weight, thus reducing the costs and improving its performance, especially for competition or high performance uses.

This invention proposes, in a manner unknown in the state of the art, that the manufacturing step of the structural shell include the distributed placement, in a mould, of a mixture of thermoplastic material and of reinforcing fibres stable at temperatures equal to or lower than the melting temperature of the thermoplastic material, the closure and heating of the mould above the melting temperature of the thermoplastic material, causing the melting of the thermoplastic material without damaging the reinforcing fibres, and the subsequent cooling of the mould, hardening the thermoplastic material with the reinforcing fibres embedded therein forming a composite material.

The thermoplastics, that is the plastics which can be repeatedly melted by heating, show great adherence with the expanded polystyrene, such that using this type of thermoplastics greatly improves the structural integrity of the helmet.

The reinforcing fibres increase the strength of the structural shell, which allows to once again increase the strength of the structural shell or allows to maintain the strength, reducing the thickness of the structural shell, making it lighter and less expensive.

Therefore, the combination of the use of a structural shell made of a composite material including thermoplastic and reinforcing fibres, together with the use of an expanded polystyrene layer adhered by close contact to the concave interior of the structural shell, provides a helmet with better performance and with a better price than the helmets known in the state of the art, since it allows to obtain a helmet that is just as strong as other known helmets, but with a thinner and lighter structural shell, or it allows to obtain a helmet that is stronger than other helmets known of the same weight, all of which with moderate manufacturing costs.

According to an additional embodiment of the method, the thermoplastic material is brought into the mould in the shape of strands and/or in the shape of a coating of the reinforcing fibres. Preferably, the thermoplastic material and the reinforcing fibres are brought into the mould included in a woven fabric or in a non-woven fabric.

Said woven fabric and/or non-woven fabric may be brought into the mould forming overlapping layers. In such a case, it is proposed that at least the layers constituting the extrados of the structural shell be constituted only by thermoplastic material strands, producing a structural shell with a greater density of reinforcing fibres in its concave interior than in its convex exterior.

The reinforcing fibres will preferably be long fibres, or long fibres with a length greater than 30 mm.

The reinforcing fibres are preferably selected among fibre glass, carbon fibre, aramid fibre or a combination thereof.

It is also proposed that the thermoplastic material preferably be polyethylene terephthalate, low-grade melting polyethylene terephthalate, or low-grade melting polyethylene terephthalate with a melting temperature comprised between 165° and 190°.

It is also proposed that the reinforcing fibres comprise between 45% and 65%, in total weight, of the structural shell.

According to an embodiment of the method, following the manufacturing of the structural shell, and without removing said structural shell from the manufacturing mould, the part of the mould defining the concave interior is removed, it is substituted by a new part of the mould defining, together with the part of the mould that has shaped the convex exterior of the structural shell, an over-moulding chamber containing the structural shell, and the expanded polystyrene layer is over-moulded on the concave interior of the structural shell in said over-moulding chamber.

This allows to reduce the necessary tools for the manufacturing, reduce the number of operations required for the manufacturing and therefore speed up said manufacturing.

This invention concerns, according to a second aspect of this invention, a body protection, obtained by means of the previously described method, comprising, in a manner known per se:
  a structural shell with a maximum thickness of 5 mm, made of thermoplastic material, and defining a concave interior and a convex exterior;
  an expanded polystyrene layer overlapping and adhered across its entire surface, by close contact, to the concave interior of the structural shell.

The proposed body protection further includes, in a manner not known in the state of the art, the following characteristics:
  the structural shell is made of a composite material comprising a thermoplastic with a preset melting temperature and reinforcing fibres embedded therein, stable at temperatures equal to or lower than the melting temperature of the thermoplastic material.

According to another embodiment of the body protection, it is proposed that the structural shell may have a greater density of reinforcing fibres in its concave interior than on its convex exterior. This allows for the reinforcing fibres to be exposed on the surface of the concave interior, or to at least affect the surface finish of said concave interior producing tiny projections or holes which allow to improve the adherence of the expanded polystyrene layer, whereas said flaws are avoided on the convex exterior of the structural shell.

This may be achieved, for example, by manufacturing the structural shell starting from two overlapping layers with different reinforcing fibre densities, typically placing said layers within a mould before closing it and proceeding to melt the thermoplastic material.

According to an embodiment of the invention, the thermoplastic is polyethylene terephthalate, commonly known with the PET acronym.

Preferably, low-grade melting polyethylene terephthalate will be used, for example, one having a melting temperature comprised between 165° and 190°, which is beneficial for the moulding process of the shell and it speeds up its manufacturing, reducing its costs.

A structural shell made of polyethylene terephthalate or of low-grade melting polyethylene terephthalate, would present distortion caused by the heat applied during the over-moulding process of the expanded polystyrene layer, necessary for obtaining attachment through close contact. However, the inclusion of reinforcing fibres within said thermoplastic material prevents this problem and, therefore, enables the use of this thermoplastic material in combination with an expanded polystyrene layer attached by close contact with no interposed adhesives.

The reinforcing fibres may preferably be selected among fibre glass, carbon fibre, aramid fibre or a combination thereof. This type of fibres is unchanged even during the manufacturing process of the structural shell, which requires the melting of the thermoplastic material, where said reinforcing fibres are embedded within a mould for the shaping of the structural shell.

Preferably, said reinforcing fibres will be long fibres, for example, with a length greater than 30 mm, which allows a greater reinforcement of the structural shell.

The use of long fibres prevents the thermoplastic material from being injected within the mould for the manufacturing of the structural shell, since said long fibres cannot flow and remain correctly distributed in a uniform manner within the mould, since, due to their length, they entangle with each other. For this reason, the use of this type of fibres makes it necessary for said reinforcing fibres to be deposited within the mould in their final position before proceeding to close the mould and to melt the thermoplastic material for the manufacturing of the structural shell.

Typically, the reinforcing fibres will form a woven fabric, that is, a fabric with a weft and warp structure, thus, the opposite of a non-woven fabric. In spite this, the use of a non-woven fabric is also contemplated.

Said fabric will be the one deposited within the mould before proceeding to close and heat it for obtaining the structural shell.

It is also proposed that said fabric, whether it be a woven or non-woven fabric, include, in addition to reinforcing fibres, thermoplastic fibres or a thermoplastic coating of the reinforcing fibres before proceeding to close and heat the mould for the manufacturing of the structural shell. This way, simultaneously to the placement of the reinforcing fibres within the mould, the thermoplastic material is also placed, which will melt shaping the structural shell, leaving the reinforcing fibres embedded therein.

It is proposed that the reinforcing fibres comprise between 45% and 65% of the total weight of the structural shell.

Typically, the expanded polystyrene layer will have a minimum thickness of 10 mm, preferably at least 15 mm.

Preferably, the proposed body protection is a helmet, or a full-face helmet, an elbow pad, a wrist guard, a kneepad, an ankle guard, a shoulder pad, at least part of a boot or of a glove, a shin guard, an arm or forearm protection, a groin guard, a chest or back protection.

Other characteristics of the invention will appear in the following detailed description of an exemplary embodiment.

BRIEF DESCRIPTION OF THE FIGURES

The above and other advantages and characteristics will be more fully understood from the following detailed description of an exemplary embodiment with reference to the attached drawings, which must be taken in an illustrative and non-limiting way, wherein.

DETAILED DESCRIPTION OF AN EXEMPLARY EMBODIMENT

The attached figures show exemplary embodiments with an illustrative, non-limiting character of the present invention.

Figure 1:
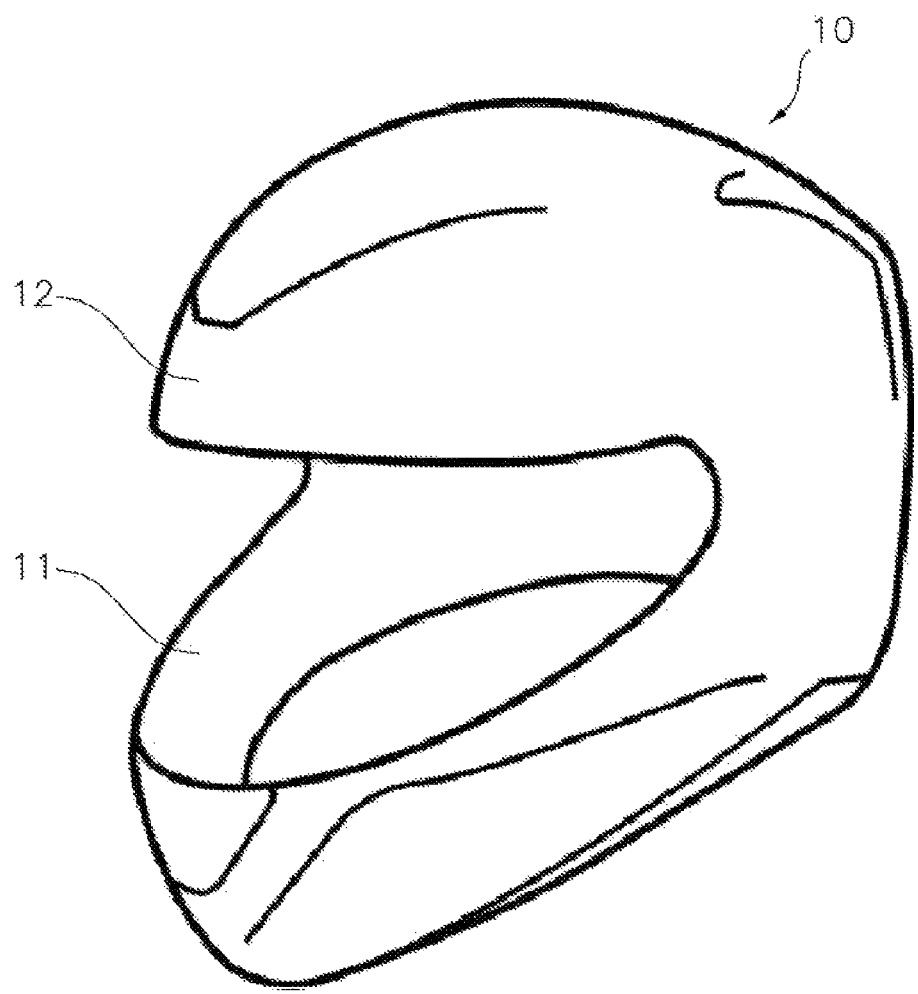
FIG. 1 shows a perspective view of a structural shell such as the one proposed according to an embodiment wherein the helmet is a full-face helmet.

A structural shell 10 is shown in FIG. 1, which in this example is a structural shell for a full-face helmet including a lower opening for the insertion of the head of the user therethrough, and a visor front opening so that the user may see therethrough.

Obviously, this invention is also applicable to other, not shown, types of helmets such as for example non-full-face helmets, or even helmets with ventilation openings, such as for example bicycle helmets.

The structural shell 10 defines a concave interior 11, intended to be opposite and to at least partially surround the head of the user of the helmet, and a convex exterior 12, which will remain exposed and will be the first to receive impacts.

The structural shell 10 is made of a composite material, that is, a composite material integrating a thermoplastic within which reinforcing fibres are embedded.

Figure 2:
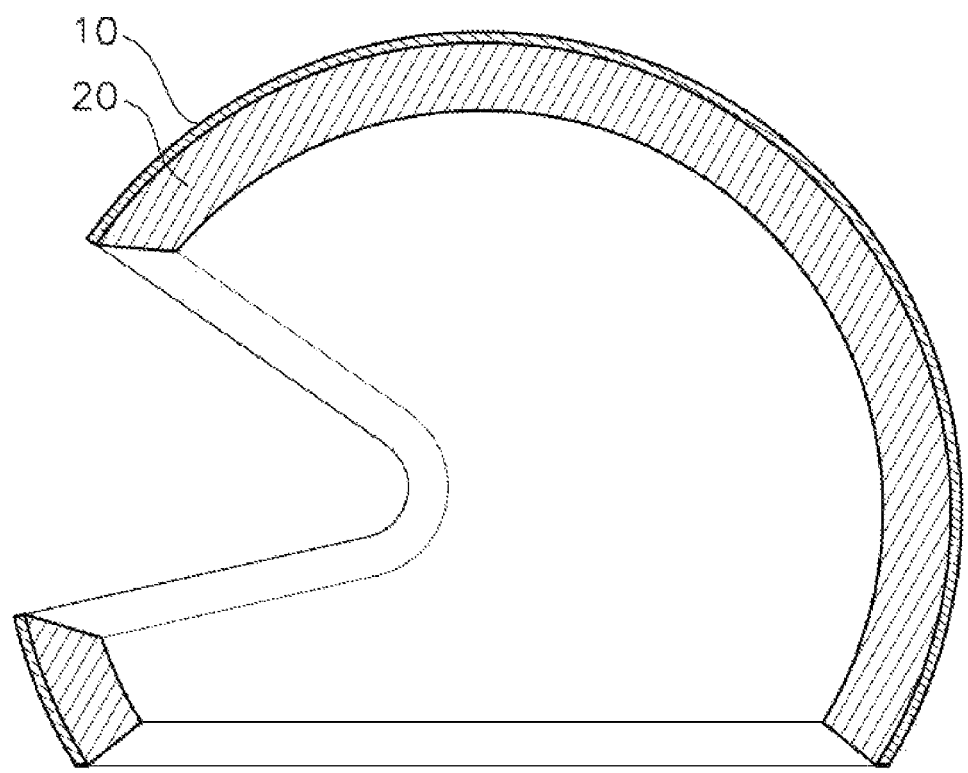
FIG. 2 shows a sectional view of a full-face helmet formed by a structural helmet such as the one shown in FIG. 1, with an expanded polystyrene layer attached by close contact in the concave interior of the structural shell.

The proposed helmet also includes an expanded polystyrene layer 20 located within the structural shell 10, as shown in FIG. 2.

The expanded polystyrene layer 20 is attached to the concave interior 11 of the structural shell 10 by means of a close attachment lacking interposed adhesives; that is, no clearance, space or separation exists between the structural shell 10 and the expanded polystyrene layer 20. This is achieved by over-moulding the expanded polystyrene layer 20 on the structural shell 10.

In this embodiment it is proposed that the structural shell have a thickness comprised between 2 mm and 4 mm.

According to the preferred embodiment, the thermoplastic material integrating the structural shell 10 will be polyethylene terephthalate, commonly known as PET, and the reinforcing fibres will be long glass, carbon or aramid fibres, or even a mixture thereof.

The polyethylene terephthalate is inexpensive, tough, durable and easy to manufacture, and also allows an excellent attachment through close contact with the expanded polystyrene layer 20. The reinforcing fibres embedded within the polyethylene terephthalate increase its structural strength, as well as prevent it from suffering heat-caused distortion during the over-moulding process of the expanded polystyrene layer.

Additionally, the use of low-grade melting polyethylene terephthalate is preferable, which is a thermoplastic material selected to have a melting temperature comprised between 165° and 190° C. This low melting temperature allows to reduce the cost of and speed up its manufacturing without compromising its strength. Thanks to the stability provided by the reinforcing fibres the low-grade melting polyethylene terephthalate will not distort during the application of the expanded polystyrene layer 20.

The invention claimed is:

1. A manufacturing method of a body protection comprising:

produced a structural shell with a maximum thickness of 5 mm, made of thermoplastic material, and defining a concave interior and a convex exterior;

over-moulding an expanded polystyrene layer overlapping the concave interior of the structural shell, producing its adhesion by close contact to the structural shell;

wherein the structural shell is produced by means of the distributed placement, in a mould, of a mixture of thermoplastic material and reinforcing fibres stable at temperatures equal to or lower than the melting temperature of the thermoplastic material, the closing of the mould and the heating of the mould above the melting temperature of the thermoplastic material, causing the melting of the thermoplastic material without damaging the reinforcing fibres, and the subsequent cooling of the mould, hardening the thermoplastic material with the reinforcing fibres embedded therein forming a composite material; and wherein:

the thermoplastic material and the reinforcing fibres are brought into the mould integrated in a woven fabric or in a non-woven fabric;

overlapping layers of woven fabric and/or of non-woven fabric are brought into the mould; and at least the layers constituting the extrados of the structural shell are constituted, before melting, only by thermoplastic material strands, producing a structural shell with greater density of reinforcing fibres in the concave interior than in the convex exterior thereof;

the expanded polystyrene layer is overmolded on the concave interior of the structural shell with no gap, separation nor any interposed material between the structural shell and the expanded polystyrene, producing the inclusion of the expanded polystyrene inside any existing nook, relief or texture of the concave intrados producing adhesion of the expanded polystyrene layer to the concave interior through a close contact between them.

2. The manufacturing method according to claim 1 wherein the thermoplastic material is brought into the mould in the shape of strands and/or in the shape of a coating of the reinforcing fibres.

3. The manufacturing method of claim 1 wherein the reinforcing fibres are fibres with a length greater than 30 mm.

4. The manufacturing method of claim 1 wherein the thermoplastic material is polyethylene terephthalate, or polyethylene terephthalate with a melting temperature comprised between 165° and 190°.

5. The manufacturing method of claim 1 wherein the reinforcing fibres are selected among fibre glass, carbon fibre, aramid fibre or a combination thereof.

6. The manufacturing method of claim 1 wherein the reinforcing fibres account for somewhere between 45% and 65%, in total weight, of the structural shell.

7. The manufacturing method of claim 1 wherein, following the manufacturing of the structural shell, and without removing said structural shell from the manufacturing mould, the part of the mould defining the concave interior is removed, being substituted by a new mould part defining, together with the part of the mould that has shaped the convex exterior of the structural shell, an over-moulding chamber containing the structural shell, and the expanded polystyrene layer is over-moulded on the concave interior of the structural shell in said over-moulding chamber.

8. A body protection, obtained by means of the method described in claim 1, comprising:
- a structural shell with a maximum thickness of 5 mm, made of thermoplastic material, and defining a concave interior and a convex exterior;
- an expanded polystyrene layer overlapping and adhered across its entire surface, by close contact, to the concave interior of the structural shell;
- wherein the structural shell is made of a composite material comprising a thermoplastic with a preset melting temperature and reinforcing fibres embedded therein stable at temperatures equal to or lower than the melting temperature of the thermoplastic,
- characterised in that:
- the reinforcing fibres form a woven fabric or a non-woven fabric within the composite material; and
- the structural shell has greater density of reinforcing fibres in its concave interior than in its convex exterior.

9. The body protection according to claim 8 wherein the thermoplastic material is polyethylene terephthalate, or polyethylene terephthalate with a melting temperature comprised between 165° and 190°.

10. The body protection according to claim 8 wherein the reinforcing fibres are selected among fibre glass, carbon fibre, aramid fibre or a combination thereof.

11. The body protection according to claim 8, wherein the reinforcing fibres are fibres with a length greater than 30 mm.

12. The body protection according to claim 8, wherein the reinforcing fibres account for somewhere between 45% and 65% in total weight of the structural shell.

13. The body protection according to claim 8, wherein the body protection is a helmet, a full-face helmet, an elbow pad, a wrist guard, a kneepad, an ankle guard, a shoulder pad, at least part of a boot or of a glove, a shin guard, an arm or a forearm protection, a groin guard, a chest or back protection.

14. A manufacturing method of a body protection comprising:
- producing a structural shell with a maximum thickness of 5 mm, made of thermoplastic material, and defining a concave interior and a convex exterior;
- over-moulding an expanded polystyrene layer overlapping the concave interior of the structural shell, producing its adhesion by close contact to the structural shell;
- wherein the structural shell is produced by means of the distributed placement, in a mould, of a mixture of thermoplastic material and reinforcing fibres stable at temperatures equal to or lower than the melting temperature of the thermoplastic material, the closing of the mould and the heating of the mould above the melting temperature of the thermoplastic material, causing the melting of the thermoplastic material without damaging the reinforcing fibres, and the subsequent cooling of the mould, hardening the thermoplastic material with the reinforcing fibres embedded therein forming a composite material; and
- wherein:
- the thermoplastic material and the reinforcing fibres are brought into the mould integrated in a woven fabric or in a non-woven fabric;
- overlapping layers of woven fabric and/or of non-woven fabric are brought into the mould; and
- at least the layers constituting the extrados of the structural shell are constituted, before melting, only by thermoplastic material strands, producing a structural shell with greater density of reinforcing fibres in a concave interior than in a convex exterior thereof;
- wherein
- following the manufacturing of the structural shell, and without removing said structural shell from the manufacturing mould, the part of the mould defining the concave interior is removed, being substituted by a new mould part defining, together with the part of the mould that has shaped the convex exterior of the structural shell, an over-moulding chamber containing the structural shell, and the expanded polystyrene layer is over-moulded on the concave interior of the structural shell in said over-moulding chamber.

* * * * *